US008861749B2

(12) United States Patent
 Felder (10) Patent No.: US 8,861,749 B2
(45) Date of Patent: *Oct. 14, 2014

(54) AUDIO OUTPUT DRIVER FOR REDUCING ELECTROMAGNETIC INTERFERENCE AND IMPROVING AUDIO CHANNEL PERFORMANCE

(75) Inventor: Matthew D. Felder, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 559 days.

This patent is subject to a terminal disclaimer.

(21) Appl. No.: 13/114,655

(22) Filed: May 24, 2011

(65) Prior Publication Data

US 2011/0222712 A1    Sep. 15, 2011

Related U.S. Application Data

(63) Continuation of application No. 11/300,236, filed on Dec. 14, 2005, now Pat. No. 8,014,533.

(51) Int. Cl.
*H03F 21/00* (2006.01)
*H04H 60/04* (2008.01)
*G06F 3/16* (2006.01)
*G10L 21/0208* (2013.01)
*H04B 1/10* (2006.01)

(52) U.S. Cl.
CPC ............ *H04H 60/04* (2013.01); *G10L 21/0208* (2013.01); *H04B 1/1036* (2013.01); *G06F 3/162* (2013.01)
USPC ............ 381/121; 381/17; 381/120; 381/94.1; 330/282; 330/294; 330/278; 330/307

(58) Field of Classification Search
CPC ...... H04H 60/04; H04B 1/1036; G06F 3/162; G10L 21/0208
USPC ........... 381/17, 15, 384, 120, 121, 27, 1, 111, 381/94.1; 330/124 R, 127, 307, 260, 282, 330/294, 278; 439/620.01, 45
See application file for complete search history.

(56) References Cited

U.S. PATENT DOCUMENTS

| 6,271,984 | B1 | 8/2001 | Ogawa et al. |
|---|---|---|---|
| 6,392,486 | B1 | 5/2002 | Lemay, Jr. |
| 6,583,662 | B1 | 6/2003 | Lim |
| 6,836,185 | B1 | 12/2004 | Pobanz |
| 7,123,083 | B2 | 10/2006 | Greitschus et al. |
| 7,130,346 | B2 | 10/2006 | Midya et al. |
| 7,729,491 | B2 | 6/2010 | Kahl et al. |
| 2004/0086128 | A1 | 5/2004 | Risch et al. |

*Primary Examiner* — Vivian Chin
*Assistant Examiner* — Con P Tran
(74) *Attorney, Agent, or Firm* — Gary Stanford (57) ABSTRACT

An audio output circuit includes an on-chip left channel amplifier module, an on-chip center channel amplifier module, and an on-chip right channel amplifier module. A left channel IC pin is operably coupled to an output of the on-chip left channel amplifier module. A right channel IC pin is operably coupled to an output of the on-chip right channel amplifier module. A center channel IC pin is operably coupled to an output of the on-chip center channel amplifier module. A center channel feedback IC pin is operably coupled to an input of the on-chip center channel amplifier module to provide a feedback loop. A left jack connection is operably coupled to the left channel IC pin. A right jack connection is operably coupled to the right channel IC pin. A jack return connection coupled to the center feedback IC pin. An inductor has a first node coupled to the jack return connection and a second node coupled to the center channel IC pin.

11 Claims, 6 Drawing Sheets

FIG. 2
audio output driver 200

FIG. 7

AUDIO OUTPUT DRIVER FOR REDUCING ELECTROMAGNETIC INTERFERENCE AND IMPROVING AUDIO CHANNEL PERFORMANCE

CROSS-REFERENCE TO RELATED APPLICATIONS

This application is a continuation of and commonly assigned U.S. application Ser. No. 11/300,236, filed on Dec. 14, 2005, which is herein incorporated by reference for all intents and purposes.

BACKGROUND OF THE INVENTION

1. Field of the Invention

This invention relates generally to audio playback circuits and more particularly to audio output drivers for reducing electromagnetic interference and improving channel isolation.

2. Description of Related Art

As is known, integrated circuits are used in a wide variety of electronic equipment, including portable, or handheld, devices. Such handheld devices include personal digital assistants ("PDA"), CD players, MP3 players, DVD players, AM/FM radio, pagers, cellular telephones, computer memory extensions (commonly referred to as a thumb drive), et cetera. Each of these handheld devices includes one or more integrated circuits to provide the functionality of the device. For example, a thumb drive may include an integrated circuit for interfacing with a computer (for example, a personal computer, a laptop, a server, a workstation, et cetera) via one of the ports of the computer (for example, Universal Serial Bus ("USB"), parallel port, et cetera) and at least one other memory integrated circuit (for example, flash memory). As such, when the thumb drive is coupled to a computer, data can be read from and written to the memory of the thumb drive. Accordingly, a user may store personalized information (for example, presentations, Internet access account information, et cetera) on their thumb drive and use any computer to access the information.

As another example, an MP3 player may include multiple integrated circuits to support the storage and playback of digitally-formatted audio (that is, formatted in accordance with the MP3 specification). One integrated circuit may be used for interfacing with a computer, another integrated circuit for generating a power supply voltage, another for processing the storage and/or playback of the digitally formatted audio data, and still another for rendering the playback of the digitally formatted audio data audible.

Integrated circuits have enabled the creation of a plethora of handheld devices; however, to be "wired" in today's electronic world, a person deploys multiple handheld devices. For example, one may own a cellular telephone for cellular telephone service, a PDA for scheduling and another for an address book, one or more thumb drives for extended memory functionality, an MP3 player for storage and/or playback of digitally recorded music, a radio, et cetera. Thus, even though a single handheld device may be relatively small, carrying multiple handheld devices on one's person can become quite burdensome.

Many of these devices also use headphones or other forms of speaker output for audio signal playback. A problem for highly-integrated circuits is that high-frequency noise from the integrated circuit carries through to the headphone or speaker leads. Filtering devices external to an integrated circuit have been used to mitigate the noise; however, these filtering devices can degrade the quality of the audio signal received at the speaker. The signal degradation can result in higher distortion, lower inter-channel isolation, and altered frequency response.

Therefore, a need exists for an audio output driver of an integrated circuit that provides improved audio channel performance and electromagnetic interference noise reduction.

DETAILED DESCRIPTION

The embodiments of the present invention may be practiced in a variety of settings that implement an audio output driver, such as an audio output driver used for reduced electromagnetic interference ("EMI") and improved audio channel performance.

For example, in one embodiment of the invention, an audio output driver provides radio reception, audio channel isolation, reduced distortion, and reduced emitted noise. Electromagnetic noise is mitigated by filtering and/or lowering the high frequency noise radiating through audio output circuitry. Furthermore, although a variety of different systems and components may be implemented, a particular system implementation is illustrated in FIG. 1 as one embodiment of a system to practice the invention.

Figure 1:
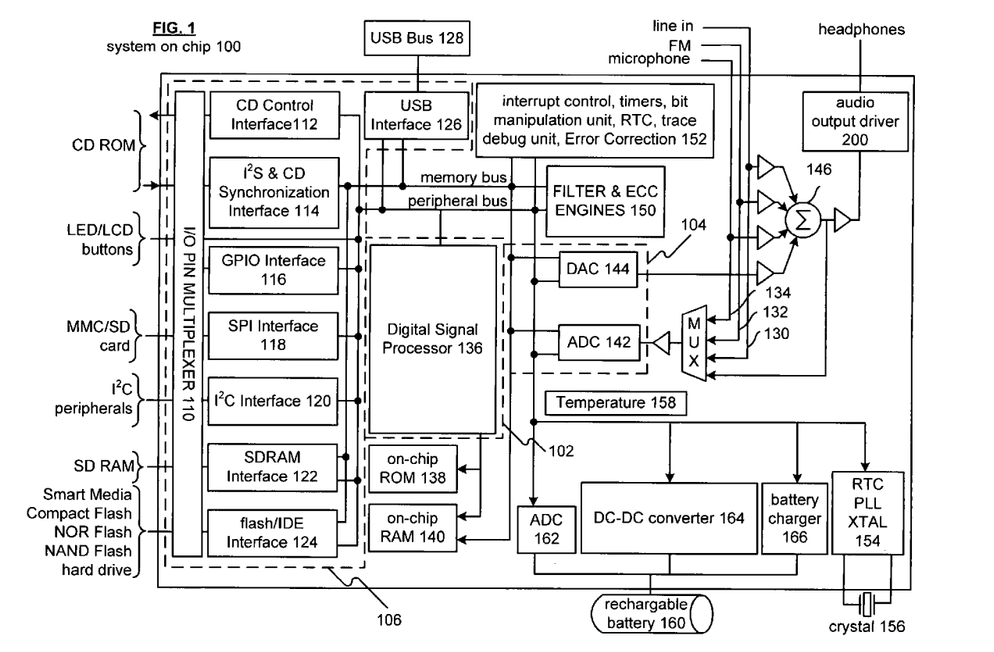
FIG. 1 is a schematic block diagram of a multiple function system-on-a-chip in accordance with the present invention.

FIG. 1 is a schematic block diagram of an example integrated circuit ("IC") 100 in which one embodiment of the invention is implemented. The example IC 100 is a single IC chip that implements a multiple function system-on-a-chip. It is to be noted that the example embodiment of FIG. 1 implements a complete media system on a single chip, but other embodiments of the invention may incorporate one or more integrated circuit chips to provide a complete system or parts of a system. As illustrated in FIG. 1, the IC 100 includes a variety of blocks that exemplify hardware components, software and interfaces resident within the IC 100. The example media system of the IC 100 may operate with one or a variety of devices.

For example, included in the IC 100 is a compact disc ("CD"); a Light Emitting Diode/Liquid Crystal Display ("LED/LCD"), buttons and/or switches; Multimedia Card/Secure Digital ("MMC/SD") cards; Inter-Integrated Circuit ("I2C") peripherals; SmartMedia, Compact Flash, NOR Flash, NAND Flash, and/or hard drive devices; and memory, such as Synchronous Dynamic Random Access Memory ("SDRAM") are some components that may be operably coupled to the IC 100 through the digital interface circuitry 106 is provided by an I/O (input/output) pin multiplexer 110. These various multiplexed connections are coupled to respective interfaces that include CD control interface 112; I2S (Inter-IC sound) and CD synchronization interface 114; General Purpose Input/Output ("GPIO") interface 116, Serial Peripheral Interface ("SPI") interface 118; I2C interface 120; SDRAM interface 122 and Flash/IDE (Integrated Device Electronics) interface 124.

Furthermore, the digital interface circuitry 106 provides a Universal Serial Bus ("USB") interface 126 for the coupling of a USB connection external to IC 100. The USB interface 126 provides compatibility with USB 2.0 specification, and is backwards compatible to a USB 1.1 specification. As should be readily appreciated, the USB interface 126 may be provided for interfacing with additional USB specifications or similar communications protocols as they become available. A microphone input, radio input and a line input are also available on IC 100 via the LINE IN 130, FM IN 132, and MIC IN 134 ports. The LINE IN 130 allows interconnection to a microphone. The MIC IN 134 allows interconnection to other audio input. FM IN 132 allows interconnection to a FM radio—which can be external to the IC 100 or may also be provided on the IC 100.

The processing core 102 of the IC 100 is a DSP (Digital Signal Processor) 136, which may be a 24-bit Digital Signal Processor. An on-chip ROM (Read Only Memory) 138 and an on-chip RAM (Random Access Memory) 140 operate as memory for DSP 136. The processing core 102 may also include microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Data stored in the ROM 138 and RAM 140, which may have 64 Mbytes or greater of storage capacity, may be text files, presentation files, user profile information for access to varies computer services (for example, Internet access, email, et cetera), digital audio files (for example, MP3 files, Windows Media Architecture ("WMA") files, MP3 PRO files, Ogg Vorbis files, Advanced Audio Coding ("AAC") files), digital video files (for example, still images or motion video such as MPEG (motion picture expert group) files, JPEG (joint photographic expert group) files), address book information, and/or any other type of information that may be stored in a digital format.

The mixed signal circuitry 104 includes an analog-to-digital converter ("ADC") 142 and a digital-to-analog converter ("DAC") 144. The ADC 142 allows for analog inputs to be converted to digital format for processing by DSP 136. Similarly, the DAC 144 is present to convert digital signals to analog signals that are provided to the audio output driver 200 via the summing module 146. Other analog signals may be summed with the DAC 144 output and/or passed to the audio output driver 200. The audio output driver 150 provides an analog-form output for playback through headphones, speakers, and/or other forms of audio output for audio signal playback (for example, digital audio tape recorders, audio equalizers, tape deck adaptors, localized wireless transmitters, et cetera). The audio output driver 200 may include components external, or off-chip, to the IC 100. The details of the audio output driver 200 are discussed in detail with respect to FIGS. 2 through 7.

Also included within the IC 100 is a filter and ECC (Error Correction Circuit) engines 150 to provide filtering and error correction operations. Other functions are shown within block 152 to provide various control and timing functions. These may include Interrupt Control, Timers, Bit Manipulation Unit, Real Time Clock ("RTC"), Trace Debug Unit, and error correction just to name a few of the operations.

The IC 100 has a RTC PLL (Real Time Clock/Phase Lock Loop) circuit 154, which is operably coupled to an external crystal 156 to provide an accurate clocking signal for circuits of the IC 100. Memory and peripheral buses are also present within the IC 100 for transfer of data and signals. A temperature sensor circuit 158 is present to monitor the temperature of IC 100.

A rechargeable battery 160 is operably coupled to a lower resolution ADC 162, a DC-DC converter 164, and battery charger 166. The ADC 162 monitors the battery voltage to determine if the battery voltage is such that battery 160 may require charging or if the battery is fully charged. The ADC 162 may also monitor the battery voltage to determine if a battery is present. Thus, if the battery is not present or is removed during use, IC 100 detects the absence of the battery through the monitoring provided by the ADC 162.

The DC-DC converter 164 operates to convert the battery voltage to a regulated operative voltage utilized by the components of the IC 100. The battery charger 166 is utilized to charge the battery when an external voltage source is coupled to the IC 100.

The IC 100 is designed to also operate from other external power sources, when such power sources are coupled to IC 100. The DC-DC converter 164 operates to regulate such external power sources to provide power to the components of the multiple-function system-on-a-chip of the IC 100.

One such power source may be provided through USB interface 126. Other interface protocols may be implemented, such as Ethernet protocols (such as "Power over Ethernet" under IEEE 802.3af), Firewire under IEEE 1394, et cetera. Increasingly, interface specifications are being generated for direct connection of handheld devices such as Personal Digital Assistants ("PDAs"), cellular phones, MP3 players, and digital cameras to one another without the need for a host PC, in which may provide interface capabilities to the multiple-function system-on-a-chip of the IC 100.

Figure 2:
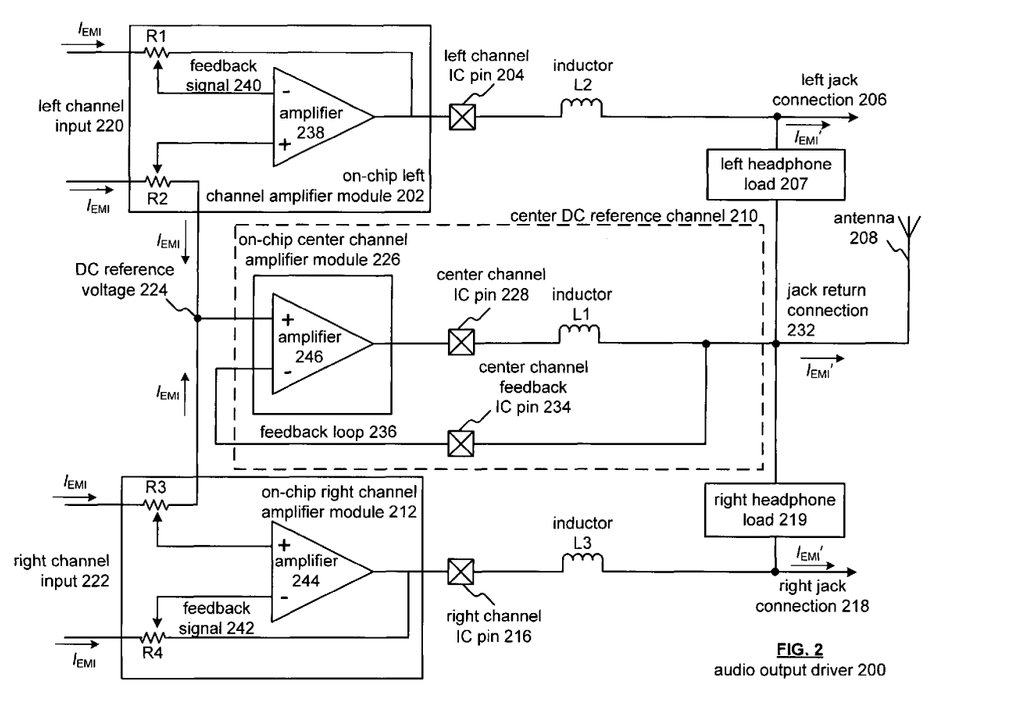
FIG. 2 illustrates a schematic block diagram of an audio output driver in accordance with the present invention.

FIG. 2 is a schematic block diagram of an audio output driver 200 that includes an on-chip left channel amplifier module 202, a left channel IC pin 204, an inductor L2, a left jack connection 206, a left headphone load 207, a center DC reference channel 210, an on-chip right channel amplifier module 212, a right channel IC pin 216, an inductor L3, an on-chip right channel amplifier module 212, a right channel IC pin 210, a right jack connection 218, and a right headphone load 219. The on-chip left channel amplifier module 202 includes an amplifier 238 and adjustable resistors R1 and R2. The on-chip right channel amplifier module 212 includes an amplifier 244 and adjustable resistors R3 and R4. The center DC reference channel 210 includes an on-chip center channel amplifier module 226 having an amplifier 246, a center channel IC pin 228, an inductor L1, a jack return connection 232, a center channel feedback IC pin 234, and a feedback loop 236.

The IC 100 provides the audio output driver 200 a left channel input 220 and a right channel input 222 having stereo audio, and/or mono-source audio, etc. The on-chip left channel amplifier module 202 selectively amplifies, or selectively adjusts the volume of, the left channel input 220. The on-chip right channel amplifier module 212 selectively amplifies, or selectively adjusts the volume of, the right channel input 222. In operation, the resistors R1, R2, R3, and R4 provide volume adjustment to the left channel input 220 and the right channel input 222 through gain adjustment to the respective amplifiers. The resistors R1, R2, R3, and R4 are adjustable tap devices that include resistor strings with switchable and/or adjustable middle taps to selectively change the feedback and/or gain of the amplifiers 238 and 244, accordingly. In other embodiments, the resistors R1 through R4 may be other adjustable resistors such as a potentiometer, or may be fixed resistors.

The on-chip left channel amplifier module 202 is in a differential input, single-ended output configuration and receives the left channel input 220 and a reference voltage 224 via the adjustable resistors R1 and R2. The adjustable resistor R1 is operably coupled between the amplifier 238 output and a first input of the amplifier 238 to provide a feedback signal 240. The adjustable resistor R2 operably couples the DC reference voltage 224 to a second input of the amplifier 238. The adjustable resistors R1 and R2 provide volume adjustment to the left channel input 220 through gain adjustment of the amplifier 238. The left channel IC pin 204 is operably coupled to the output of the on-chip left channel amplifier module 202. The output of the amplifier 238 is operably coupled to the left jack connection 206. The operable coupling of the left jack connection 206 to the left channel IC pin 204 includes the inductor L2, where a first node of the inductor L2 is coupled to the left channel IC pin 204 and a second node of the inductor L2 is coupled to the left jack connection 206. The left headphone load 207, provided by operably coupled headphones and/or other forms of audio output for audio signal playback, is operably coupled between the left jack connection 206 and the jack return connection 232.

The on-chip right channel amplifier module 212 is in a differential input, single-ended output configuration and receives the right channel input 222, and the DC reference voltage 224, via the adjustable resistors R3 and R4. The adjustable resistor R4 is operably coupled between the amplifier 244 output and a first input of the amplifier 244 to provide a feedback signal 242. The adjustable resistor R3 operably couples the reference voltage 224 to a second input of the amplifier 244. The adjustable resistors R3 and R4 provide volume adjustment to the right channel input 222 through gain adjustment of the amplifier 244.

The right channel IC pin 216 is operably coupled to the output of the on-chip right channel amplifier module 212 via the output of the amplifier 244. The operable coupling of the right jack connection 218 to the right channel IC pin 216 includes the inductor L3, where a first node of the inductor L3 is coupled to the right channel IC pin 216 and a second node of the inductor L3 is coupled to the right jack connection 218. The right headphone load 219, provided by operably coupled headphones and/or other forms of audio output for audio signal playback, is operably coupled between the right jack connection 218 and the jack return connection 232.

Referring to the center DC reference channel 210, a DC reference voltage 224 is provided through the center DC reference channel to the jack return connection 232. The voltage reference 224 is input to the amplifier 246. The center channel IC pin 228 is operably coupled to an output of the on-chip center channel amplifier module 226 via the amplifier 246 output. The center channel feedback IC pin 234 is operably coupled to a negative input of the amplifier 246 to provide a feedback loop 236. The jack return connection 232 is coupled to the center channel feedback IC pin 234, completing the feedback loop 236. The inductor L1 has a first node coupled to the jack return connection 232 and a second node coupled to the center channel IC pin 228.

The audio output driver 200 is operably coupled to the antenna 208 via the jack return connection 232. The antenna 208 may be provided as a headphone lead from a headphone connection or other such audio output devices, including stereo speakers or other audio components that may be coupled to the audio output driver 200. Generally, the antenna 208 operates to provide radio signal reception for FM reception and/or AM reception, as well as carry audio playback to a user.

The antenna 208, however, also carries undesirable electromagnetic interference, or noise, generated from the IC 100 carried through the audio output driver 200 with the audio playback. The EMI is generally depicted as a current, IEMI. The IEMI current may result from radiated or conducted energy, as well as switching noise, from digital circuitry of the IC 100. This electromagnetic interference is an electromagnetic disturbance that can interrupt, obstruct, or otherwise degrade or limit audio playback of the audio information carried by the left channel input 220 and right channel input 222.

In operation, the inductors L1, L2, and L3 mitigate and/or suppress the electromagnetic interference IEMI to the audio playback by filtering or reducing the noise level output. Each of the inductors, however, can degrade the signal swing and distortion performance of the audio output due to non-ideal characteristics of the inductors, particularly with respect to the DC reference channel 210, causing audio channel isolation degradation. To realize the benefit of mitigating and/or suppressing the electromagnetic interference (where the mitigated and/or suppressed electromagnetic interference is depicted as IEMI'), while also minimizing audio channel isolation degradation, the inductor L1 is placed within the feedback loop 236 of the on-chip center channel amplifier module 226, as contrasted to an inductor placed outside the feedback loop 236 (for example, on the antenna 208). As may be readily appreciated by one of ordinary skill in the art, the on-chip center channel amplifier module 226 may be in a configuration other than a non-inverting configuration. The effect of the inductors on electromagnetic interference is discussed in detail with reference to FIGS. 4 and 5.

Also, the channel amplifier modules 202, 236, and 212 may be configured in other adjustable-gain and/or fixed-gain amplifier configurations suitable for audio applications that take advantage of the inductor-based EMI minimization and/or suppression, and also reduces the non-ideal inductor degradation effects on audio quality. For example, the amplifier configurations can be inverting, non-inverting, differential, singled-ended, et cetera.

The inductors of FIG. 2 (as well as inductors L4 and L5, which are discussed in detail with reference to FIG. 6) are made of materials suitable for inductor fabrication, such as a ferrite core material. Ferrites are non-conductive ceramics manufactured from the oxides of nickel, zinc, manganese, et cetera. In this regard, they have useful filter characteristics for deployment in inductor devices, depending on the construction and frequency range sought. In general, the inductors provide operational filtering at higher frequencies where the ferrite core becomes resistive, providing effective filtering of injected EMI noise below the radio frequency level. Also, ferrite materials provide low DC signal loss. The inductors may be in the form of substantially-cylindrical ferrite beads, wherein the inner channel of the ferrite bead receives the conductor providing the channel connection (for example, the connection from the center channel IC pin 228 to the jack return connection 232). Other configurations may be used, such as deploying multiple axially-aligned holes through the ferrite bead.

Figure 3:
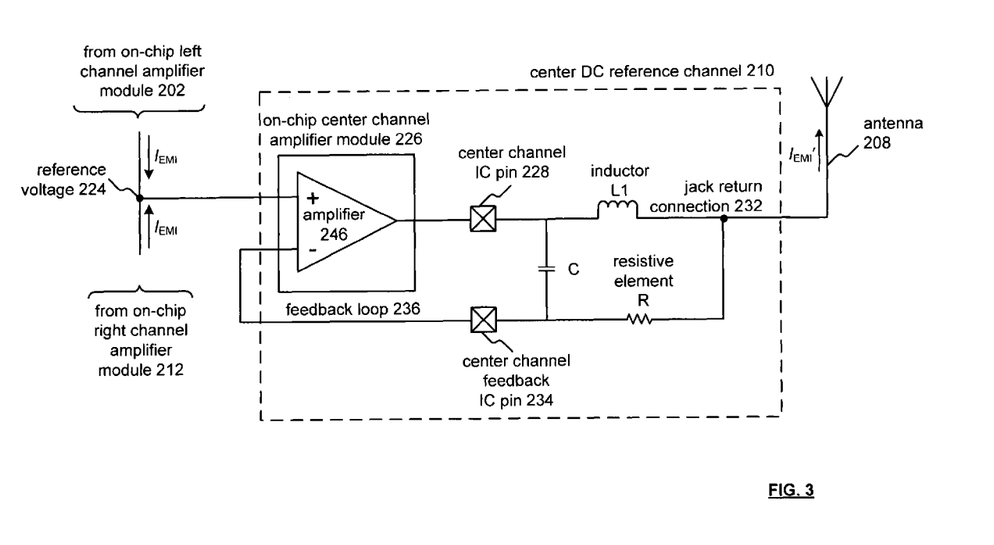
FIG. 3 illustrates a schematic block diagram of another embodiment of a center direct-current ("DC") reference channel of the audio output driver of FIG. 2.

FIG. 3 illustrates a schematic block diagram of another embodiment of a center DC reference channel 210. The coupling of the jack return connection 232 to the center feedback IC pin 234 includes a resistive element R, where a first node of the resistive element R is coupled to the center feedback IC pin 234, and a second node is operably coupled to the jack return connection 232. A capacitor C has a first node coupled to the center channel IC pin 228 and a second node coupled to the center channel feedback IC pin 234.

In operation, the resistive element R provides additional IC protection from electrostatic discharges that can occur when a headphone (or other forms of audio output) is plugged into or otherwise couples with the IC 100 via the audio output driver 200. The coupling device is discussed in detail with reference to FIG. 7. Because the resistive element R introduces an additional pole to the feedback loop 236, the capacitor C sufficiently stabilizes the feedback loop 236.

Figure 4:
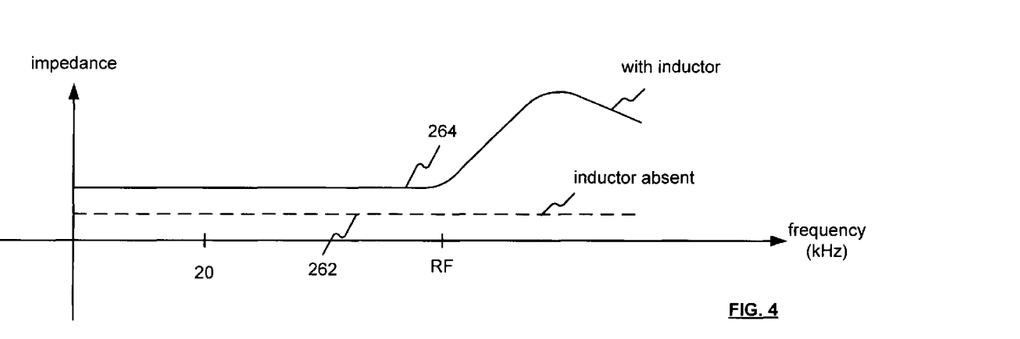
FIG. 4 illustrates a graph of the inductive impedance versus frequency of an inductor in accordance with the present invention.

FIG. 4 illustrates a graph of the inductive impedance versus frequency of an inductor. The x-axis provides a unit of frequency in kilohertz; the y-axis refers to the corresponding impedance of the inductor. The dashed line 262 illustrates the general impedance of a channel, such as the center DC reference channel 210, when the inductor is absent. The line 264 represents the impedance, as a function of the frequency, with the inductor included in the channel path. As the frequency increases, the impedance of the inductor L1 also increases (though not at a linear or proportional rate), and then decreases at higher frequencies.

Figure 5:
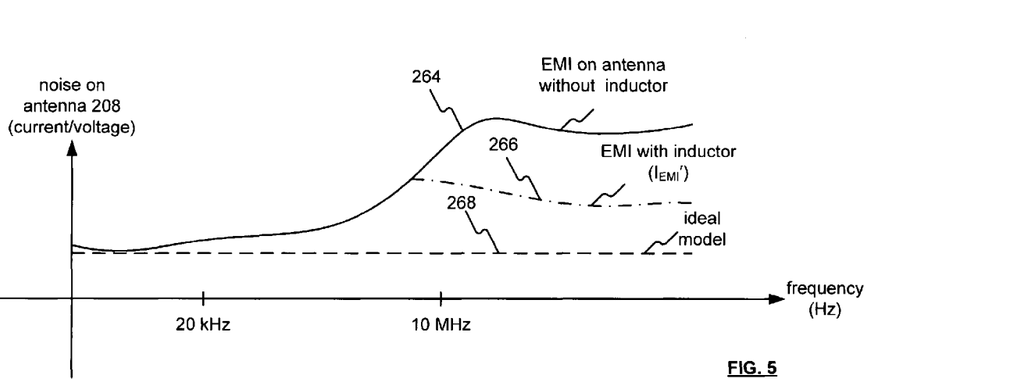
FIG. 5 illustrates a graph of the electromagnetic noise on an antenna in accordance with the present invention.

FIG. 5 illustrates a graph of the noise on the antenna 208 over frequency. The x-axis provides a unit of frequency in hertz; the y-axis refers to the electromagnetic interference IEMI present on the antenna 208. The line 264 illustrates the switching noise, or EMI, present on the antenna 208 without an inductor. The dash-dot line 266 represents the IEMI' present on the antenna 208 with an inductor. The dash line 268 represents the ideal model of IEMI on the antenna 208. As shown with respect to the dash-dot line 266 and the line 264, the inductor operates to minimize and/or suppress the IEMI, depicted as IEMI', present on the antenna 208.

Figure 6:
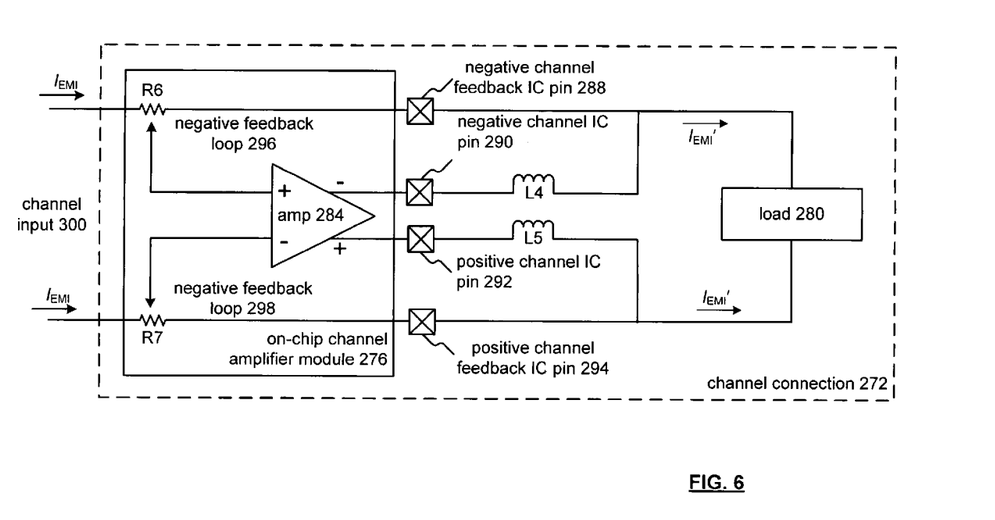
FIG. 6 illustrates a schematic block diagram of another embodiment of a channel connection for an audio output driver in accordance with the present invention.

FIG. 6 illustrates a schematic block diagram of another embodiment of a channel connection 272 for an audio output driver 200. The channel connection 272 is in a differential configuration that includes an on-chip channel amplifier module 276, a load 280, a first inductor L4 and a second inductor L5. The on-chip channel amplifier module 276 includes an amp 284, an adjustable resistor R6, and adjustable resistor R7.

The channel connection 272 may receive a left channel input 220 or a right channel input 222 for stereo audio, mono-source audio, and/or other audio sources. For simplicity, the input to the channel connection 272 is depicted as channel input 300. The on-chip channel amplifier module 276 receives the channel input 300 via the adjustable resistors R6 and R7. In operation, the adjustable resistor R6 and the adjustable resistor R7 provide volume adjustment to the channel input 300 through gain adjustment to the amplifier 284. The resistors R6 and R7 are adjustable tap devices that include resistor strings with switchable and/or adjustable middle taps to selectively change the feedback and/or gain of the amplifier 284. In other embodiments, the resistors R6 and R7 may be other adjustable resistors such as a potentiometer, or may be fixed resistors. The negative channel IC pin 290 is operably coupled to a negative output of the on-chip channel amplifier module 276. The negative channel feedback IC pin 288 is operably coupled to a positive input of the on-chip channel amplifier module 276 to provide a negative feedback loop 296. The positive channel IC pin 292 is operably coupled to a positive output of the on-chip channel amplifier module 276 via the amplifier 284. The positive channel feedback IC pin 294 is operably coupled to a negative input of the on-chip channel amplifier module 276 via the amplifier 284. The load 280, provided by operably coupled headphones and/or other forms of audio output for audio signal playback (for example, digital audio tape recording, audio equalizers, tape deck adaptors, audio localized transmitters, et cetera), is operably coupled to the negative channel feedback IC pin 288 and the positive channel feedback IC pin 294. The first inductor L4 has a first node coupled to the load 280 and a second node coupled to the negative channel IC pin 290. The second inductor L5 has a first node coupled to the load 280 and a second node coupled to the positive channel IC pin 292.

In operation, the channel input 300 carries the electromagnetic interference IEMI component that includes switching noise from the digital components of the IC 100. The electromagnetic interference IEMI is minimized and/or suppressed, as reflected in FIG. 5, by the placement of the first inductor L4 and the second inductor L5 in series with the output signal path defined from the channel input 300 to the output across load 280. As should be readily appreciated by one of ordinary skill in the art, the differential configuration can convey enhanced analog audio as compared with a single-ended configuration.

Figure 7:
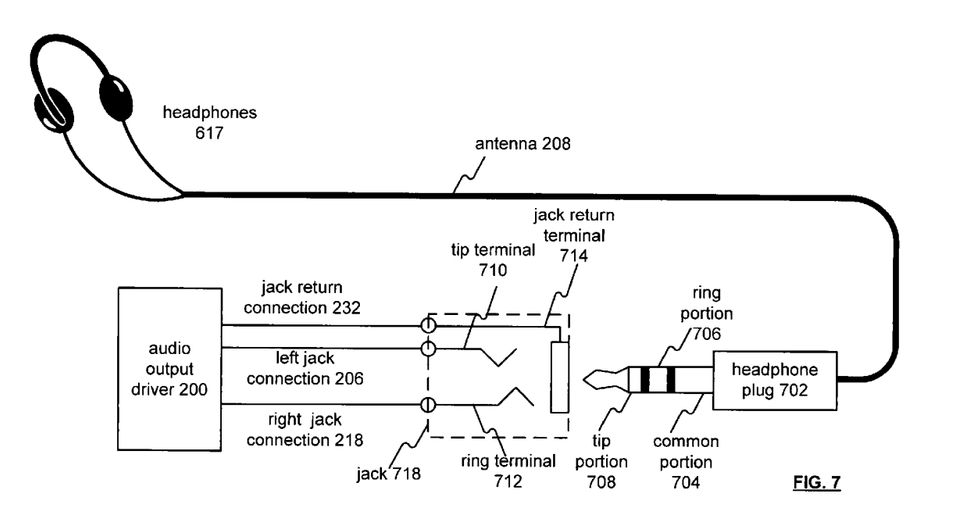
FIG. 7 illustrates a schematic block diagram of the interface between a jack and a headphone plug used in providing audio playback through an audio output driver in accordance with the present invention.

FIG. 7 illustrates a schematic block diagram of the interface between a jack 718 and a headphone plug 702 used in providing audio playback from the audio output driver 200, such as that of FIG. 2.

The audio output driver 200 provides an output to a jack return connection 232, a left jack connection 206, and a right jack connection 218. The jack 718 includes a jack return terminal 714, a tip terminal 710 and a ring terminal 712.

The jack return connection 232 is operably coupled to the jack return terminal 714 of the jack 718, which may be provided as a 3.5 mm "mini pin" jack. The left jack connection 206 is operably coupled to the tip terminal 710 of the jack 718. The right jack connection 218 is operably coupled to the ring terminal 712 of the jack 718. With respect to the operation as shown, is a stereo-ready application with respect to the use of the tip terminal 710, the ring terminal 712 and the jack return terminal 714. The headphone plug 702 has a tip 708, which is configured to be operably coupled with the tip terminal 710, a ring portion 706, which is configured to be operably coupled with the ring terminal 712 of the jack 718, and a common portion 704, which is configured to be operably coupled with the sleeve 716 and to the jack return terminal 714. As shown, the headphone plug 702 has a sleeve 716 extending to headphones 717. As is known, the headphones provide audio playback of audio signals that are conveyed through the audio output driver 200.

The headphones 617, which also may be referred to as earphones, stereo phones, headsets, "cans," et cetera, are a pair of transducers that receive an electrical signal from the IC 100 and use speakers placed in close proximity to a user's ears. The headphones 617 may be used to prevent others from hearing the audio playback for privacy or to protect others. They are also used to exclude external sounds, particularly in sound recording studios and in noisy environments. Other forms of audio output devices may be used for audio signal playback, recording, and/or intermediary audio functionality.

The headphones 617 are detachable through the jack 718. The selective attachment and/or detachment of the headphone plug 702 with the jack 718 can produce an electrostatic discharge that could potentially damage an unprotected integrated circuit. The resistive element R (see FIG. 3) can provide additional protection from such electrostatic discharges.

In general, the audio output driver 200, whether in single-ended configuration or a differential configuration, may be selectively deployed in capless-mode configuration or a capmode (that is, with a DC blocking capacitor) configuration. As may be appreciated by one of ordinary skill in the art, avoiding use of large DC blocking capacitors through a capless configuration can reduce cost, save integrated-circuit space, and decrease complexity.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (that is, where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, et cetera, provides a desired relationship. For example, when the desired relationship is that a first signal has a greater magnitude than a second signal, a favorable comparison may be achieved when the magnitude of the first signal is greater than that of the second signal or when the magnitude of the second signal is less than that of the first signal.

The preceding discussion has presented an audio output driver for reduced EMI and improved audio channel quality. In general, this is achieved through an audio output driver having an on-chip channel amplifier, a channel IC pin that is operably coupled to an output of the on-chip channel amplifier; a channel feedback IC pin that is operably coupled to an input of the on-chip channel amplifier to provide a feedback loop, and a jack return connection that is coupled to the channel feedback IC pin. An inductor is provided in the audio output channel driver, wherein a first node of the inductor is coupled to the jack return connection and a second node of the inductor is coupled to the channel IC pin. As one of average skill in the art will appreciate, other embodiments may be derived from the teachings of the present invention without deviating from the scope of the claims.

What is claimed is:

1. An audio output channel, comprising:
an on-chip audio channel amplifier that amplifies an audio signal suitable for an audio output device;
a channel output IC pin operably coupled to an output of the on-chip audio channel amplifier;
a channel feedback IC pin operably coupled to an input of the on-chip audio channel amplifier to provide a feedback loop;
a jack return connection coupled to the channel feedback IC pin;
an inductor having a first end coupled to the jack return connection and having a second end coupled to the channel output IC pin; and
wherein the inductor is operative to pass audio frequencies of the amplified audio signal at the channel output IC pin to the jack return connection while suppressing electromagnetic interference frequencies at the channel output IC pin from the jack return connection, in which the electromagnetic interference frequencies are higher than the audio frequencies.

2. The audio output channel of claim 1, further comprising:
a resistive element having a first end coupled to the channel feedback IC pin and a second end coupled to the jack return connection; and
a capacitive element having a first end coupled to the channel output IC pin and a second node coupled to the channel feedback IC pin.

3. The audio output channel of claim 1, wherein the inductor comprises a ferrite-core inductor.

4. The audio output channel of claim 1, further comprising an antenna operably coupled to the jack return connection.

5. The audio output channel of claim 4, wherein the antenna is a headphone lead.

6. The audio output channel of claim 1, further comprising:
an on-chip DC reference voltage node;
an on-chip left channel audio amplifier coupled to the DC reference voltage node;
an on-chip right channel audio amplifier coupled to the DC reference voltage node; and
wherein the on-chip audio channel amplifier comprises a central audio channel amplifier having a non-inverting input coupled to the DC reference voltage node and having an inverting input coupled to the channel feedback IC pin.

7. An audio system, comprising:
a DC reference voltage node;
a left channel audio amplifier coupled to said DC reference voltage node;
a right channel audio amplifier coupled to said DC reference voltage node;
a center channel audio amplifier having a non-inverting input coupled to said DC reference voltage node, having a negative input, and having an output;
a jack return connection coupled to said inverting input of said center channel audio amplifier;
an inductor having a first end coupled to said jack return connection and having a second end coupled to said output of said center channel audio amplifier; and
wherein said inductor is operative to pass audio frequencies at said output of said center channel audio amplifier to said jack return connection while suppressing electromagnetic interference frequencies at said output of said center channel audio amplifier from said jack return connection, in which said electromagnetic interference frequencies are greater than said audio frequencies.

8. The audio system of claim 7, further comprising:
a resistive element having a first end coupled to said inverting input of said center channel audio amplifier and a second end coupled to said jack return connection; and
a capacitive element having a first end coupled to said output of said center channel audio amplifier and a second node coupled to said inverting input of said center channel audio amplifier.

9. The audio system of claim 7, wherein said inductor comprises a ferrite-core inductor.

10. The audio system of claim 7, further comprising an antenna operably coupled to said jack return connection.

11. The audio system of claim 10, wherein said antenna comprises a headphone lead.

* * * * *